(12) United States Patent
Diehl et al.

(10) Patent No.: US 10,768,284 B1
(45) Date of Patent: Sep. 8, 2020

(54) SYSTEMS AND METHODS FOR USING AUDIO CUE FOR ALIGNMENT

(71) Applicant: Pony AI Inc., Grand Cayman (KY)

(72) Inventors: Peter G. Diehl, Shanghai (CN); Cheng Jin, Fremont, CA (US)

(73) Assignee: Pony AI Inc., Grand Cayman (KY)

( * ) Notice: Subject to any disclaimer, the term of this patent is extended or adjusted under 35 U.S.C. 154(b) by 0 days.

(21) Appl. No.: 16/419,995

(22) Filed: May 22, 2019

(51) Int. Cl.
*G01S 17/93* (2020.01)
*G01S 7/497* (2006.01)
(Continued)

(52) U.S. Cl.
CPC ............ *G01S 7/4972* (2013.01); *G01S 7/481* (2013.01); *G01S 17/931* (2020.01); *G06F 3/165* (2013.01); *G08B 21/18* (2013.01); *H04R 3/04* (2013.01)

(58) Field of Classification Search
CPC .......... G01B 9/04; B60K 31/00; B60K 31/18; B60Y 2200/11; B60Y 2200/12; B60Y 2200/126; B60Y 2200/13; B60Y 2200/30; B60Y 2200/40; B60Y 2200/50; B60Y 2200/90; G01C 21/00; G01N 21/9501; G01N 21/47; G01N 21/4788; G01N 21/956; G01N 21/95607; G01N 21/6428; G01N 21/6458; G01N 21/6486; G01N 2021/4735; G01N 2021/4792; G01N 2021/6419; G01N 2021/6421; G01N 2021/6439; G01N 2021/8822; G01N 2021/8829; G01N 21/21; G01N 21/4738; G01N 21/55; G01N 21/64; G01N 21/6452; G01N 21/6456; G01N 21/8806; G01N 21/95623; G01N 2201/02; G01N 2201/0638; G01N 2201/0683; G01N 33/4833; G01M 11/0214; G01M 11/025; G01M 11/0271; G02B 15/14; G02B 2027/014; G02B 2027/0178; G02B 21/16; G02B 27/0093; G02B 27/283; G02B 2027/0138; G02B 2027/0141; G02B 2027/0174; G02B 2027/0187; G02B 21/0088; G02B 21/06; G02B 21/088; G02B 21/22; G02B 21/245; G02B 21/26; G02B 21/36; G02B 21/361; G02B 21/367; G02B 26/06; G02B 26/0833; G02B 26/101; G02B 27/01; G02B 27/017; G02B 27/0172; G02B 27/1006; G02B 27/142; G02B 27/145; G02B 27/285; G02B 27/286; G02B 27/644; G02B 5/005; G02B 5/208; G02B 5/283; G01J 2003/2826; G01J 3/2823
See application file for complete search history.

(56) References Cited

U.S. PATENT DOCUMENTS 3,544,988 A * 12/1970 Astheimer ............ G01P 13/00
340/600
4,095,901 A * 6/1978 Brouwer ............... B21B 39/165
356/153

(Continued)

*Primary Examiner* — Michael P Stafira
(74) *Attorney, Agent, or Firm* — Sheppard Mullin Richter & Hampton LLP

(57) ABSTRACT

Systems and methods are provided for enclosure alignment. An enclosure can be translated along a fixture. A signal can be detected, during the translation of the enclosure, from a signal transmitter to a signal receiver. An intensity of the signal can be determined. An audio cue can be emitted based on the intensity of the signal. The enclosure may be aligned along the fixture based on the emitted audio cue.

20 Claims, 9 Drawing Sheets

(51) Int. Cl.
   *H04R 3/04* (2006.01)
   *G01S 7/481* (2006.01)
   *G08B 21/18* (2006.01)
   *G06F 3/16* (2006.01)
   *G01S 17/931* (2020.01)

(56) References Cited

U.S. PATENT DOCUMENTS

| | | | | |
|---|---|---|---|---|
| 5,026,998 | A * | 6/1991 | Holzl | G01B 5/25 250/559.37 |
| 5,331,898 | A * | 7/1994 | Villedieu | E01B 23/04 104/2 |
| 5,798,828 | A * | 8/1998 | Thomas | G01B 11/26 33/286 |
| 5,848,791 | A * | 12/1998 | Beyer | F41J 9/02 273/359 |
| 6,205,406 | B1 * | 3/2001 | Hahn | G06K 9/32 250/200 |
| 6,236,471 | B1 * | 5/2001 | Lee | B41J 19/145 358/474 |
| 8,054,976 | B2 * | 11/2011 | Harrison | H04B 10/1143 380/278 |
| 8,590,167 | B2 | 11/2013 | Odom | |
| 8,845,332 | B1 * | 9/2014 | Reid | A61B 5/1072 33/512 |
| 9,660,321 | B2 | 5/2017 | Trerise | |
| 1,014,664 | A1 | 12/2017 | Halker et al. | |
| 1,043,733 | A1 | 3/2018 | Daniels | |
| 10,502,593 | B1 * | 12/2019 | Johnson | G01D 5/3473 |
| 2006/0215300 | A1 * | 9/2006 | Starr | G11B 17/225 360/69 |
| 2007/0188736 | A1 * | 8/2007 | Fouquet | G01N 21/6428 356/39 |
| 2007/0237675 | A1 * | 10/2007 | Nichols | B01L 3/565 422/63 |
| 2008/0201097 | A1 * | 8/2008 | Stromberg | G01B 11/272 702/94 |
| 2012/0218544 | A1 * | 8/2012 | Razzano | A61B 6/14 356/72 |
| 2013/0208278 | A1 * | 8/2013 | Dardarian | G01B 11/272 356/400 |
| 2014/0099175 | A1 * | 4/2014 | Guidry | E21B 19/165 414/22.51 |
| 2015/0225082 | A1 * | 8/2015 | Levron | B64D 9/003 244/137.1 |
| 2015/0278038 | A1 * | 10/2015 | Halker | G06F 11/20 714/3 |
| 2017/0274787 | A1 * | 9/2017 | Salter | H02J 50/10 |
| 2017/0363448 | A1 * | 12/2017 | Dunn | G01B 11/002 |
| 2018/0069431 | A1 * | 3/2018 | Mastrandrea | H01M 10/625 |
| 2018/0174317 | A1 * | 6/2018 | Slettemoen | G01D 5/26 |
| 2018/0290551 | A1 * | 10/2018 | Jones | G05D 1/0225 |
| 2019/0021690 | A1 * | 1/2019 | Munier | A61B 6/587 |
| 2019/0033056 | A1 * | 1/2019 | Jensen | G01B 11/2441 |
| 2019/0106296 | A1 * | 4/2019 | Barneman | B66B 19/002 |
| 2019/0123598 | A1 * | 4/2019 | Patmore | H02J 5/005 |
| 2019/0125292 | A1 * | 5/2019 | Nebosis | A61B 6/587 |
| 2019/0179028 | A1 * | 6/2019 | Pacala | G01S 17/10 |
| 2019/0301899 | A1 * | 10/2019 | Clos | B64D 9/003 |
| 2020/0149360 | A1 * | 5/2020 | Traaserud | E21B 19/16 |

* cited by examiner

SYSTEMS AND METHODS FOR USING AUDIO CUE FOR ALIGNMENT

FIELD OF THE INVENTION

This disclosure relates to enclosure alignment on a fixture. More particularly, this disclosure relates to systems and methods for alignment of a sensor enclosure to a fixture mounted on an autonomous vehicle and using an audio cue for alignment.

BACKGROUND

In general, a vehicle (e.g., an autonomous vehicle, a driverless vehicle, etc.) can have myriad sensors onboard the vehicle. For example, the myriad sensors can include light detection and ranging sensors (or LiDARs), radars, cameras, etc. The myriad sensors can play a central role in functioning of an autonomous or driverless vehicle. For example, LiDARs can be utilized to detect and identify objects (e.g., other vehicles, road signs, pedestrians, buildings, etc.) in a surrounding. LiDARs can also be utilized to determine relative distances of the objects in the surrounding. For another example, radars can be utilized to aid with collision avoidance, adaptive cruise control, blind side detection, etc. For yet another example, cameras can be utilized to recognize, interpret, and/or analyze contents or visual cues of the objects. Data collected from these sensors can then be processed and used, as inputs, to make driving decisions. The myriad sensors can be replaced with replacement sensors or, in some cases, moved from one vehicle to another vehicle.

SUMMARY

Various embodiments of the present disclosure can include systems and methods configured for enclosure alignment. An enclosure can be translated along a fixture. A signal can be detected, during the translation of the enclosure, from a signal transmitter to a signal receiver. An intensity of the signal can be determined. An audio cue can be emitted based on the intensity of the signal. The enclosure can be aligned along the fixture based on the emitted audio cue.

In some embodiments, the signal transmitter and the signal receiver are integrated into the enclosure, and a reflective surface is integrated into the fixture.

In some embodiments, the signal transmitter is integrated into the enclosure and the signal receiver is integrated into the fixture.

In some embodiments, the intensity of the signal is determined by computing an intensity value corresponding to the signal received by the signal receiver.

In some embodiments, a final alignment location for the enclosure can be determined based on a location along the fixture that corresponds to a maximum intensity of the signal.

In some embodiments, the audio cue is a series of discrete audio and emitting the audio cue based on the intensity of the signal comprises increasing a frequency of the series of discrete audio as the intensity of the signal increases.

In some embodiments, the audio cue is a continuous audio and emitting the audio cue based on the intensity of the signal comprises increasing a pitch of the continuous audio as the intensity of the signal increases.

In some embodiments, the audio cue is the continuous audio and emitting the audio cue based on the intensity of the signal comprises increasing an amplitude of the continuous audio as the intensity of the signal increases.

In some embodiments, the audio cue is a plurality of sound profiles and emitting the audio cue based on the intensity of the signal comprises emitting a sound profile "Not Aligned" when the intensity of the signal is zero; emitting a sound profile "Closer" when the intensity of the signal is between the zero and a maximum value; and emitting a sound profile "Aligned" when the intensity of the signal is at the maximum value.

In some embodiments, the signal transmitter is a light source and the signal receiver is a light detector.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

Figure 1A:
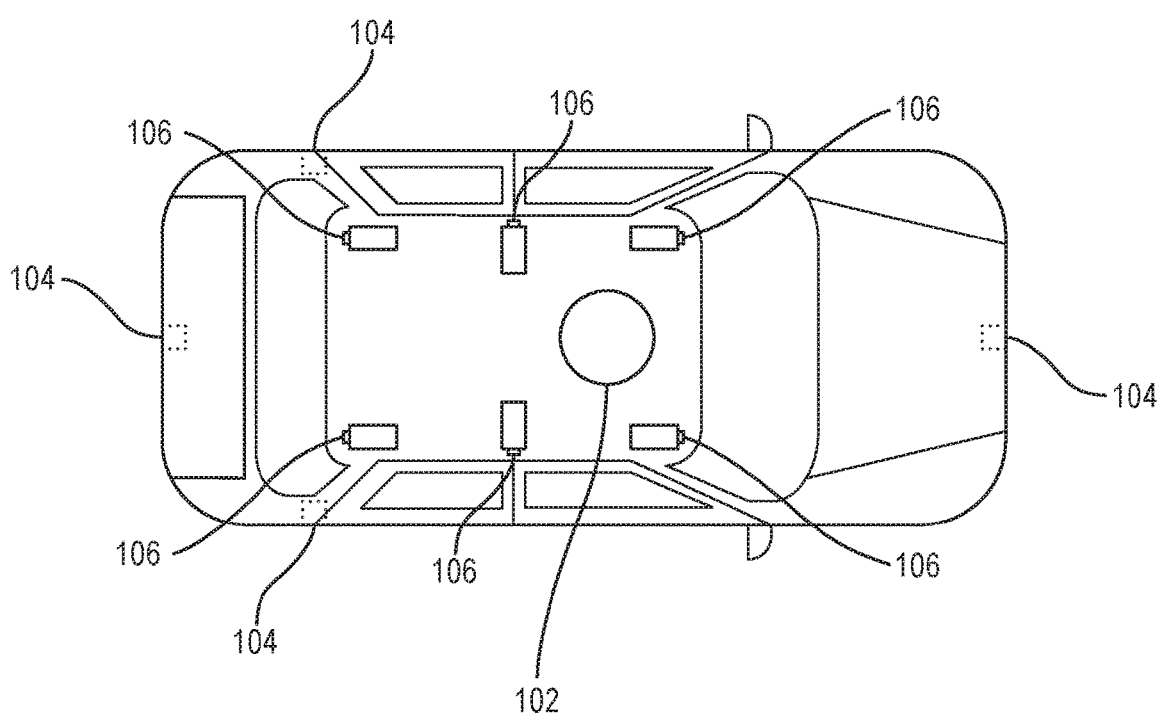
FIG. 1A illustrates an example autonomous vehicle, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

In general, a vehicle (e.g., an autonomous vehicle, a driverless vehicle, etc.) can have myriad sensors onboard the vehicle. The myriad sensors can include light detection and ranging sensors (or LiDARs), radars, cameras, GPS, sonar, ultrasonic, IMU (inertial measurement unit), accelerometers, gyroscopes, magnetometers, FIR (far infrared) sensors, etc. The myriad sensors can play a central role in functioning of an autonomous or driverless vehicle. For example, LiDARs can be utilized to detect and identify objects (e.g., other vehicles, road signs, pedestrians, buildings, etc.) in a surrounding. LiDARs can also be utilized to determine relative distances of the objects in the surrounding. For another example, radars can be utilized to aid with collision avoidance, adaptive cruise control, blind side detection, assisted parking, etc. For yet another example, camera can be utilized to recognize, interpret, and/or analyze contents or visual cues of the objects. Cameras and other optical sensors can capture image data using charge coupled devices (CCDs), complementary metal oxide semiconductors (CMOS), or similar elements. An IMU may detect abnormal occurrences such as a bump or pothole in a road. Data collected from these sensors can then be processed and used, as inputs, to make driving decisions (e.g., acceleration, deceleration, direction change, etc.). For example, data from these sensors may be further processed into an image histogram of a graphical representation of tonal distribution in an image captured by the one or more sensors.

In general, sensors onboard an autonomous vehicle must be aligned, meaning that the sensors must be placed at specific or particular locations on the autonomous vehicle such that data collected from the sensors is reliable to make driving decisions. For example, a LiDAR relies on speed of light and position of lasers beams to determine relative distances and locations of objects in a three dimensional surrounding. Data collected by the LiDAR, therefore, is highly dependent (or calibrated) to a specific location to which the LiDAR is located. Depending on where the LiDAR is located, the distances and the locations of the objects as determined by the LiDAR can vary. For example, time it takes for a reflected light to reach a LiDAR located in a front of the autonomous vehicle will be different from time it takes for the same reflected light to reach a LiDAR located in a back of the autonomous vehicle. This slight time difference, in some cases, can make the distance and the location determination no longer reliable for use in guiding the autonomous vehicle. Therefore, under conventional approaches, to replace sensors or to move sensors from one vehicle to another vehicle, each sensor must go through a lengthy alignment process to ensure that the sensors are placed correctly, calibrations associated with the sensors are not disrupted, and the data collected from the sensors remains reliable for use. Accordingly, replacing sensors or moving sensors from one vehicle to another vehicle can be laborious, time consuming, cumbersome, and inefficient.

Various embodiments overcome problems specifically arising in the realm of autonomous vehicle technology. In various embodiments, the myriad sensors (e.g., LiDARs, radars, cameras, etc.) onboard the autonomous vehicle can be encased or housed in an enclosure. The enclosure allows the myriad sensors to be moved from one vehicle to another vehicle in a single act, rather than to move the myriad sensors one by one. In some embodiments, the enclosure can be installed or mounted onto a fixture of the autonomous vehicle. For example, the enclosure can be installed or mounted onto a roof rack or a custom rack fitted to the autonomous vehicle. The enclosure can be translated or moved along the fixture. In some embodiments, the enclosure is made of a material that is transparent to electromagnetic waves receptive to the myriad sensors encased by the enclosure. For example, the enclosure can be made from a transparent material that allows laser lights, radio waves, and visible lights emitted and/or received by the LiDARs, the radars, and the cameras, respectively, to enter and/or exit the enclosure. In some embodiments, the enclosure can include a signal transmitter. The signal transmitter can emit a signal. This signal can be received or detected by a signal receiver. In some cases, the signal can be reflected before being received or detected by the signal receiver. In one embodiment, both the signal transmitter and the signal receiver are integrated into the enclosure. In another embodiment, the signal transmitter is integrated into the enclosure while the signal receiver is integrated into the fixture of the autonomous vehicle. An intensity of the signal can be determined. Based on the intensity of the signal, a determination on whether the enclosure is properly aligned (positioned or placed) onto the fixture of the autonomous vehicle can be made. In some embodiments, the enclosure can include an audio device that emits an audio cue based on the intensity of the signal. For example, the stronger or higher the intensity, the more audible (e.g., louder, faster, etc.) the audio cue becomes. The audio cue can serve as an indication or a feedback to an extend that the enclosure is properly aligned. Various embodiments are discussed herein in greater detail.

FIG. 1A illustrates an example autonomous vehicle 100, according to an embodiment of the present disclosure. An autonomous vehicle 100 generally refers to a category of vehicles that are capable of sensing and driving in a surrounding by itself. The autonomous vehicle 100 can include myriad sensors (e.g., LiDARs, radars, cameras, etc.) to detect and identify objects in the surrounding. Such objects may include, but not limited to, pedestrians, road signs, traffic lights, and/or other vehicles, for example. The autonomous vehicle 100 can also include myriad actuators to propel and navigate the autonomous vehicle 100 in the surrounding. Such actuators may include, for example, any suitable electro-mechanical devices or systems to control a throttle response, a braking action, a steering action, etc. In some embodiments, the autonomous vehicle 100 can recognize, interpret, and analyze road signs (e.g., speed limit, school zone, construction zone, etc.) and traffic lights (e.g., red light, yellow light, green light, flashing red light, etc.). For example, the autonomous vehicle 100 can adjust vehicle speed based on speed limit signs posted on roadways. In some embodiments, the autonomous vehicle 100 can determine and adjust speed at which the autonomous vehicle 100 is traveling in relation to other objects in the surrounding. For example, the autonomous vehicle 100 can maintain a constant, safe distance from a vehicle ahead (e.g., adaptive cruise control). In this example, the autonomous vehicle 100 maintains this safe distance by constantly adjusting its vehicle speed to that of the vehicle ahead.

In various embodiments, the autonomous vehicle 100 may navigate through roads, streets, and/or terrain with limited or no human input. The word "vehicle" or "vehicles" as used in this paper includes vehicles that travel on ground (e.g., cars, trucks, bus, etc.), but may also include vehicles that travel in air (e.g., drones, airplanes, helicopters, etc.), vehicles that travel on water (e.g., boats, submarines, etc.). Further, "vehicle" or "vehicles" discussed in this paper may or may not accommodate one or more passengers therein. Moreover, phrases "autonomous vehicles," "driverless vehicles," or any other vehicles that do not require active human involvement can be used interchangeably.

In general, the autonomous vehicle 100 can effectuate any control to itself that a human driver can on a conventional vehicle. For example, the autonomous vehicle 100 can accelerate, brake, turn left or right, or drive in a reverse direction just as a human driver can on the conventional vehicle. The autonomous vehicle 100 can also sense environmental conditions, gauge spatial relationships (e.g., distances between objects and itself), detect and analyze road signs just as the human driver. Moreover, the autonomous vehicle 100 can perform more complex operations, such as parallel parking, parking in a crowded parking lot, collision avoidance, etc., without any human input.

In various embodiments, the autonomous vehicle 100 may include one or more sensors. As used herein, the one or more sensors may include a LiDAR 102, radars 104, cameras 106, GPS, sonar, ultrasonic, IMU (inertial measurement unit), accelerometers, gyroscopes, magnetometers, FIR (far infrared) sensors, and/or the like. The one or more sensors allow the autonomous vehicle 100 to sense a surrounding around the autonomous vehicle 100. For example, the LiDARs 102 can be configured to generate a three-dimensional map of the surrounding. The LiDARs 102 can also be configured to detect objects in the surrounding. For another example, the radars 104 can be configured to determine distances and speeds of objects around the autonomous vehicle 100. For yet another example, the cameras 106 can be configured to capture and process image data to detect and identify objects, such as road signs, as well as analyzing content of the objects, such as speed limit posted on the road signs.

In the example of FIG. 1A, the autonomous vehicle 100 is shown with the LiDAR 102 mounted to a roof or a top of the autonomous vehicle 100. The LiDAR 102 can be configured to generate three dimensional maps and detect objects in the surrounding. In the example of FIG. 1A, the autonomous vehicle 100 is shown with four radars 104. Two radars are directed to a front-side and a back-side of the autonomous vehicle 100, and two radars are directed to a right-side and a left-side of the autonomous vehicle 100. In some embodiments, the front-side and the back-side radars can be configured for adaptive cruise control and/or accident avoidance. For example, the front-side radar can be used by the autonomous vehicle 100 to maintain a safe distance from a vehicle ahead of the autonomous vehicle 100. For another example, if the vehicle ahead experiences a sudden reduction in speed, the autonomous vehicle 100 can detect this sudden change in motion, using the front-side radar, and adjust its vehicle speed accordingly. In some embodiments, the right-side and the left-side radars can be configured for blind-spot detection. In the example of FIG. 1A, the autonomous vehicle 100 is shown with six cameras 106. Two cameras are directed to the front-side of the autonomous vehicle 100, two cameras are directed to the back-side of the autonomous vehicle 100, and two cameras are directed to the right-side and the left-side of the autonomous vehicle 100. In some embodiments, the front-side and the back-side cameras can be configured to detect, identify, and determine objects, such as cars, pedestrian, road signs, in the front and the back of the autonomous vehicle 100. For example, the front-side cameras can be utilized by the autonomous vehicle 100 to identify and determine speed limits. In some embodiments, the right-side and the left-side cameras can be configured to detect objects, such as lane markers. For example, side cameras can be used by the autonomous vehicle 100 to ensure that the autonomous vehicle 100 drives within its lane.

Figure 1B:
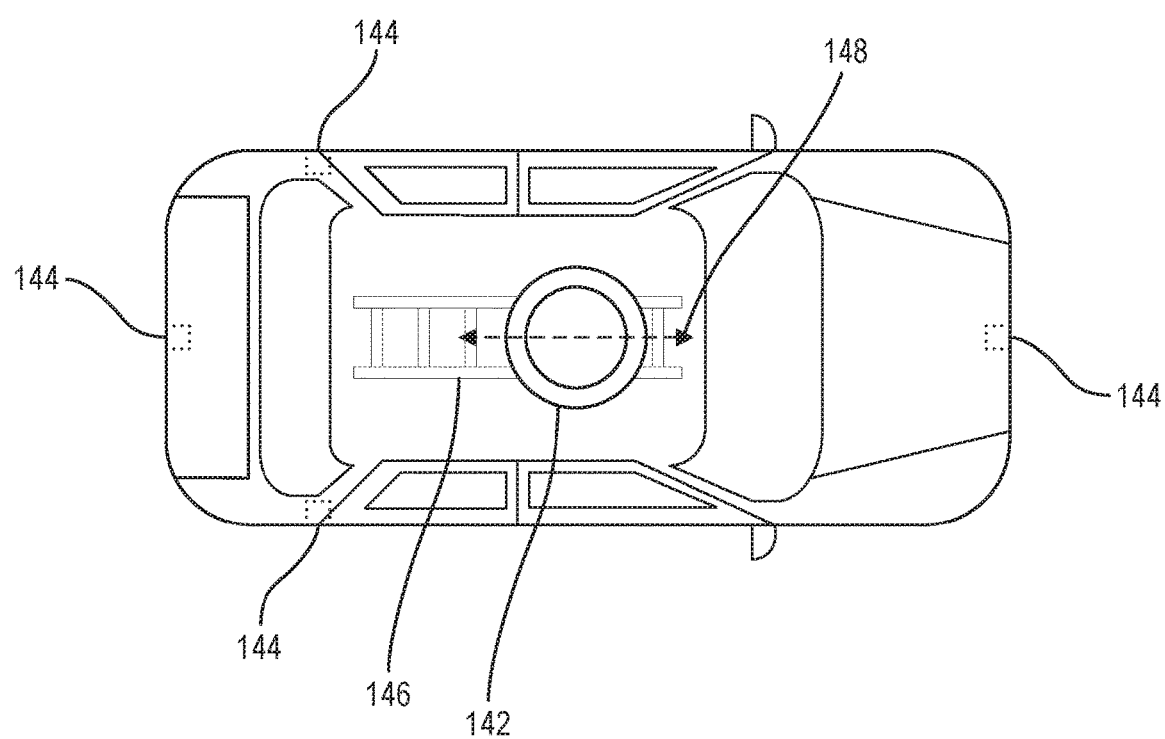
FIG. 1B illustrates an example autonomous vehicle, according to an embodiment of the present disclosure.

FIG. 1B illustrates an example autonomous vehicle 140, according to an embodiment of the present disclosure. In the example of FIG. 1B, the autonomous vehicle 140 is shown with an enclosure 142 and four radars 144. The enclosure 142 is mounted onto a fixture 146. In some embodiments, the fixture 146 can be a roof rack or a custom rack fitted to the autonomous vehicle 140. The enclosure 142, when mounted onto the fixture 146, can translate along a linear axis 148. For example, once mounted onto the fixture 146, the enclosure 142 can be adjusted to move in a forward or a backward direction with respect to the autonomous vehicle 140, along the linear axis 148 of the fixture 146. In some embodiments, the enclosure 142 can be moved along a nonlinear axis. In some embodiments, the enclosure 142 can include a LiDAR, a plurality of radars and cameras, and its associated electronics. In another embodiment, the enclosure 142 can include a LiDAR, a plurality of cameras, and its associated electronics. Many variations are possible. As discussed, the enclosure 142 allows sensors to be packaged compactly or tightly and to be moved from one vehicle to another in a single act, rather than a series of acts which requires moving the sensors one at a time and align each sensor individually thereafter. In various embodiments, the enclosure 142 can made from any materials that are transparent to electromagnetic waves emitted by or receptive to sensors encased in the enclosure 142. For example, the enclosure 142 must be transparent to laser beams emitted and received by the LiDAR inside the enclosure 142. In various embodiments, an outer cover of the enclosure 142 can be made from tempered glass, plexiglass, chemically strengthened glass, and the likes. In some embodiments, the enclosure can include a signal transmitter. The signal transmitter can emit a signal which can be received by a signal receiver. An intensity of the signal can be determined. As the enclosure 142 translates or moves along the fixture 146, the intensity as received, detected, or seen by the signal receiver changes. Based on this intensity, a determination of an extent of an alignment of the enclosure 142 with respect to the fixture 146 can be made. For example, when the intensity of the signal as received by the signal receiver is zero, the enclosure 142 is not at its final alignment location along the fixture 146. When the intensity of the signal is at or near its maximum value, the enclosure 142 is deemed to be at or near the final alignment location along the fixture 146. In some embodiments, the enclosure 142 can include an audio device. The audio device can emit an audio cue based on the intensity of the signal. For example, as the enclosure 142 translates along the fixture 146 and moves closer and closer to the final alignment location, the intensity of the signal received by the signal receiver increases. In this example, the audio cue emitted by the audio device changes in relation to the intensity of the signal to indicate that the enclosure 142 is nearing the final alignment location. Using audio cues to indicate an extent of an alignment of an enclosure will be discussed in greater detail with respect to FIGS. 4A and 4B herein.

Figure 2:
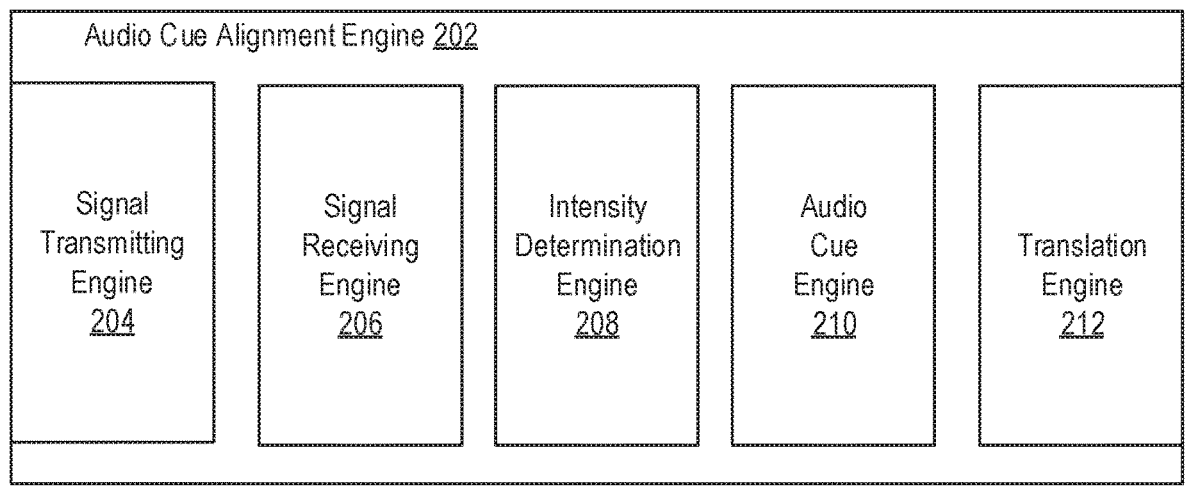
FIG. 2 illustrates an example enclosure alignment system, according to an embodiment of the present disclosure.
Figure 2:
Figure 2:
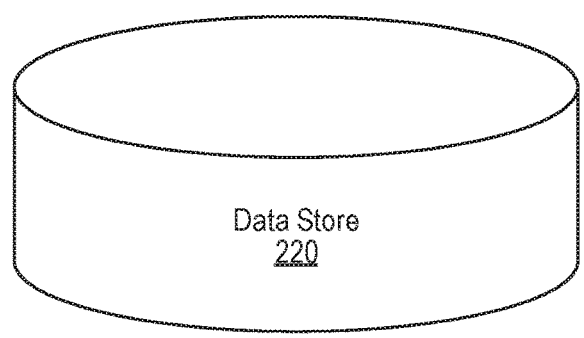

FIG. 2 illustrates an example enclosure alignment system 200, according to an embodiment of the present disclosure. The enclosure alignment system 200 can include an audio cue alignment engine 202 that further includes one or more processors and memory. The processors, in conjunction with the memory, can be configured to perform various operations associated with the enclosure alignment system 200. For example, the processors and memory can be used to compute an intensity associated with a signal and emit an audio cue based on the computed intensity. The audio cue alignment engine 202 can be configured to provide an audio cue that indicates an extent of an alignment of an enclosure (e.g., the enclosure 142 of FIG. 1B) to a fixture (e.g., the fixture 146 of FIG. 1B). As shown in FIG. 2, in some embodiments, the audio cue alignment engine 202 can further include a signal transmitting engine 204, a signal receiving engine 206, an intensity determination engine 208, and an audio cue engine 210. The signal transmitting engine 204, the signal receiving engine 206, the intensity determination engine 208, and the audio cue engine 210 will be discussed in further detail below. In some embodiments, the audio cue alignment engine 202 may further include a translation engine 212 that translates or aligns the enclosure along the fixture, for example, in response to an audio cue provided by the audio cue engine 210 that indicates that the enclosure requires further alignment.

In some embodiments, the enclosure alignment system 200 can additionally include at least one data store 220 that is accessible to the audio cue alignment engine 202. In some embodiments, the data store 220 can be configured to store parameters, data, configuration files, or machine-readable codes of the signal transmitting engine 204, the signal receiving engine 206, the intensity determination engine 208 and the audio cue engine 210.

The signal transmitting engine 204 can be configured to emit a signal to be received or detected by the signal receiving engine 206. In various embodiments, the signal transmitting engine 204 can be implemented with a light source. The light source can be an electro-optical device that converts electricity or electric signal into light or optical signal. In one embodiment, the light source can be a photodiode such as a light emitting diode (LED). In another embodiment, the light source can be a laser diode. In various embodiments, the signal emitted by the signal transmitting engine 204 depends on the light source used. For example, if LED is used as the light source, the signal emitted, correspondingly, will be visible light. For another example, if laser diode is used as the light source, the signal emitted, correspondingly, will be coherent light. In various embodiments, the signal transmitting engine 204 can be integrated into an enclosure (e.g., the enclosure 142 of FIG. 1B).

In some embodiments, the signal transmitting engine 204 can include a reflective surface. The reflective surface can redirect a path of the light emitted by the light source. For example, in an embodiment, the light emitted from the light source can be redirected by or reflected from the reflective surface so that the light can be detected by the signal receiving engine 206. The light produced by the light source can offset at an angle as measured from the reflective surface. This light (i.e., incident light) hits the reflective surface and is redirected by the reflective surface by that same angle. The signal transmitting engine 204 will be discussed in greater detail with respect to FIG. 3A herein.

The signal receiving engine 206 can be figured to receive or detect the signal emitted from the signal transmitting engine 204. In various embodiments, the signal receiving engine 206 can be implemented with a light detector. The light detector can be an electro-optical device that converts light or optical signal into electricity or electric signal. This electric signal can then be further processed and analyzed by the intensity determination engine 208 to compute or determine an intensity value corresponding to the signal (e.g., light) received by the signal receiving engine 206. In general, signals emitted by the signal transmitting engine 204 is matched or tuned to the signal receiving engine 206. For example, if a LED light source is used, the light detector is matched or tuned be most receptive to light emitted by the LED light source. For another example, if a laser diode is used, the light detector is matched or tuned to be most receptive to light (e.g., laser or coherent light) emitted by the laser diode. In these examples, tuning of the light detector prevents stray lights (or ambient lights) from skewing intensity computation. In various embodiments, the signal receiving engine 206 can be integrated into the enclosure. In other embodiments, the signal receiving engine 206 can in integrated into a fixture of an autonomous vehicle.

The intensity determination engine 208 can be configured to compute or measure an intensity value corresponding to the signal received or detected by the signal receiving engine 206. The signal received, detected, or seen by the signal receiving engine 206 depends on position of the enclosure with respect to the fixture. For example, in an embodiment where the signal transmitting engine 204 is incorporated into the enclosure, if the enclosure is not near its final alignment position, the signal emitted by the signal transmitting engine 204 will not be not received, detected, or seen by the signal receiving engine 206. In this example, the intensity determination engine 208 computes or measures the corresponding intensity value to be zero, which, in this case, indicates that the enclosure is not in its final alignment location. As the enclosure translates or moves closer to the final alignment location along the fixture, at some point, the signal will be partially received, detected, or seen by the signal receiving engine 206, and the intensity determination engine 208 computes or measures the intensity value to be some fraction or portion of a maximum intensity value. This intensity value indicates that the enclosure is close to the final alignment location. If the signal is fully received, detected, or seen by the signal receiving engine 206, the intensity determination engine 208 computes or measures the intensity value to be at the maximum intensity value. In this case, the maximum intensity value indicates that the enclosure is at the final alignment position. In some embodiments, the maximum intensity value can be determined based on historical intensity values. For example, there can be a fleet of autonomous vehicle with each vehicle being exactly the same and having exactly same sensor enclosure and fixture. In this example, because the enclosure's location does not change in relation to the fixture, the location corresponding to the maximum intensity value does not change from one autonomous vehicle to another autonomous vehicle. Based on the historical intensity values, the final alignment position can be determined for the whole fleet of autonomous vehicles. In some embodiments, the historical intensity values can be used to detect alignment errors. For example, relative enclosure location in relation to a fixture can be compared with a known enclosure location to identify errors in the enclosure location. In some embodiments, if light sensor and light detectors are used to implement functionalities of the signal transmitting engine 204 and signal receiving engine 206, an intensity of a signal is equivalent to a luminance of a light.

The audio cue engine 210 can be configured to emit or produce an audio cue based on the intensity of the signal seen by the signal receiving engine 206. The audio cue engine 210 can be implemented with an audio device (e.g., a computing device with a speaker output, a mobile device with a speaker, etc.). The audio cue engine 210 can emit or produce the audio cue as a function of the intensity of the signal. For example, when the intensity of the signal measured by the signal receiving engine 206 is low or weak, the audio cue emitted by the audio cue engine 210 will low, weak, or slow. When the intensity of the signal is high or strong, the audio cue emitted by the audio cue engine 210 will be high, strong, or fast. In various embodiments, the audio cue emitted by the audio cue engine 210 can be linearly related to the intensity. While, in other embodiments, the audio cue emitted by the audio cue engine 210 can be exponentially related to the intensity. Many variations are possible.

In some embodiments, the audio cue engine 210 can emit or produce a discrete audio (e.g., a "beep" sound). This discrete audio can vary its frequency depending on the intensity of the signal. For example, in the embodiment where the signal transmitting engine 204 is incorporated into the enclosure, when the enclosure is not near its final alignment location, the intensity of the signal seen by the signal receiving engine 206 is nonexistent or zero. Based on this intensity measurement, the audio cue engine 210 can emit the discrete audio at a certain low frequency (e.g., one hertz or one "beep" sound per second). In this example, as the enclosure translates or moves closer to the final alignment location, the intensity as measured by the signal receiving engine 206 increases and, correspondingly, the frequency of the discrete audio increases (e.g., from one hertz to two hertz). When the enclosure is at or near the final alignment location, the intensity of the signal is at its maximum value and the frequency of the discrete audio is also at its maximum frequency (e.g., five hertz).

In some embodiments, the audio cue engine 210 can emit a continuous audio. This continuous audio can vary its pitch depending on the intensity of the signal. For example, when the enclosure is not near its final alignment location, the intensity of the signal seen by the signal receiving engine 206 is nonexistent or zero. Based on this intensity measurement, the audio cue engine 210 can emit a low pitch continuous audio (e.g., a low frequency sound). In this example, as the enclosure translates closer to the final alignment location, the intensity as seen by the signal receiving engine 206 increases and the pitch of the continuous audio increases as well (e.g., a higher frequency sound). When the enclosure is at or near the final alignment location, the intensity is at its maximum and the pitch of the continuous audio is also at its maximum. Other variations are also possible. For example, the audio cue engine 210 can emits an audio cue that varies its amplitude (e.g., loudness) based on intensity of signal. For example, the audio cue becomes louder as the intensity increases. In another example, the audio cue engine 210 can emits different audio (e.g., music, or sound profile) based on intensity of signal. For example, as the intensity increases from a zero value to a maximum value, the audio cue engine 210 can emit sound profiles of "Not Aligned," "Getting Closer," and "Aligned," with each sound profile corresponding to a given level of the intensity. The audio cue engine 210 will be discussed in greater detail with respect to FIGS. 4A and 4B herein.

Figure 3A:
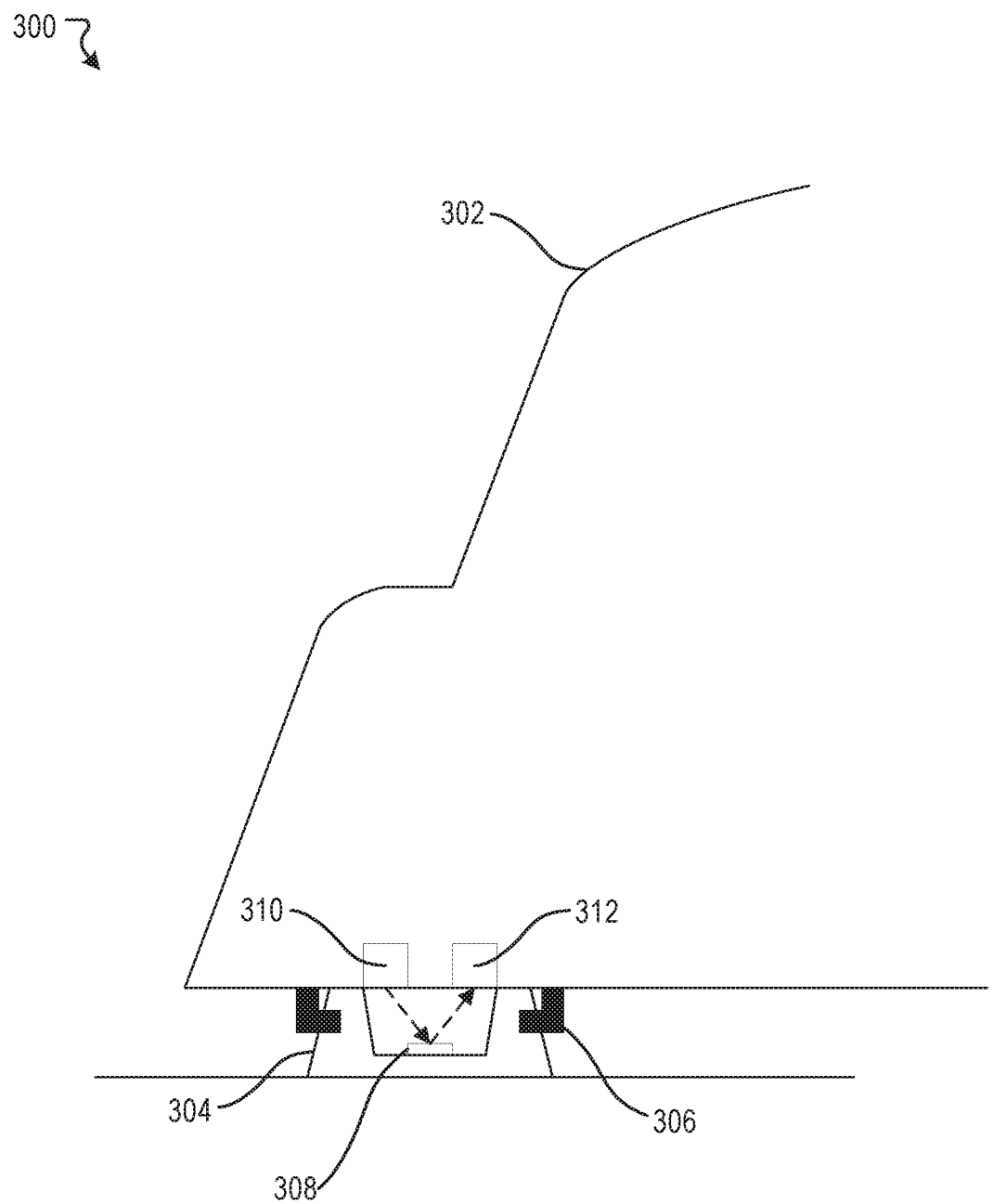
FIG. 3A illustrates a cross-sectional view of an example enclosure alignment system, according to an embodiment of the present disclosure.

FIG. 3A illustrates a cross-sectional view of an example enclosure alignment system 300, according to an embodiment of the present disclosure. In this example, the enclosure alignment system 300 includes an enclosure 302 mounted onto a fixture 304 secured by one or more securing clamps 306. The one or more securing clamps 306 hold the enclosure 302 securely onto the fixture 304. In some embodiments, the enclosure 302 can include a plurality of sensors (e.g., a LiDAR and a plurality of cameras) that are associated with an autonomous vehicle. In some embodiments, the enclosure 302 can be made from materials that are transparent to lights receptive to the plurality of sensors. Once mounted, the enclosure 302 can translate along rails of the fixture 304. In some embodiments, the enclosure 302 can include a light source 310 and a light detector 312. The light source 310 can emit a light that can be received by the light detector 312. In this example, because the light source 310 and the light detector 312 are both integrated into the enclosure 302, the light will not be received by the light detector 314 unless the light is reflected. As such, the enclosure alignment system 300 can further include a reflective surface 308 at a particular location within the rails of the fixture 304. This particular location indicates a final alignment location for which the enclosure 302 is positioned with respect to the fixture 304. This alignment position ensures that calibration associated with the plurality of sensors encased by the enclosure 302 remains intact and thus, data collected by the plurality of sensors can be subsequently processed and analyzed without further calibration. Therefore, as the enclosure 302 is translated along the fixture 304, at some point, the light emitted by the light source 310 will be reflected off from the reflective surface 308 and received by the light detector 312. When this occurs, it is an indication that the enclosure 302 is positioned correctly on the fixture 304, therefore the enclosure 302 is aligned.

Figure 3B:
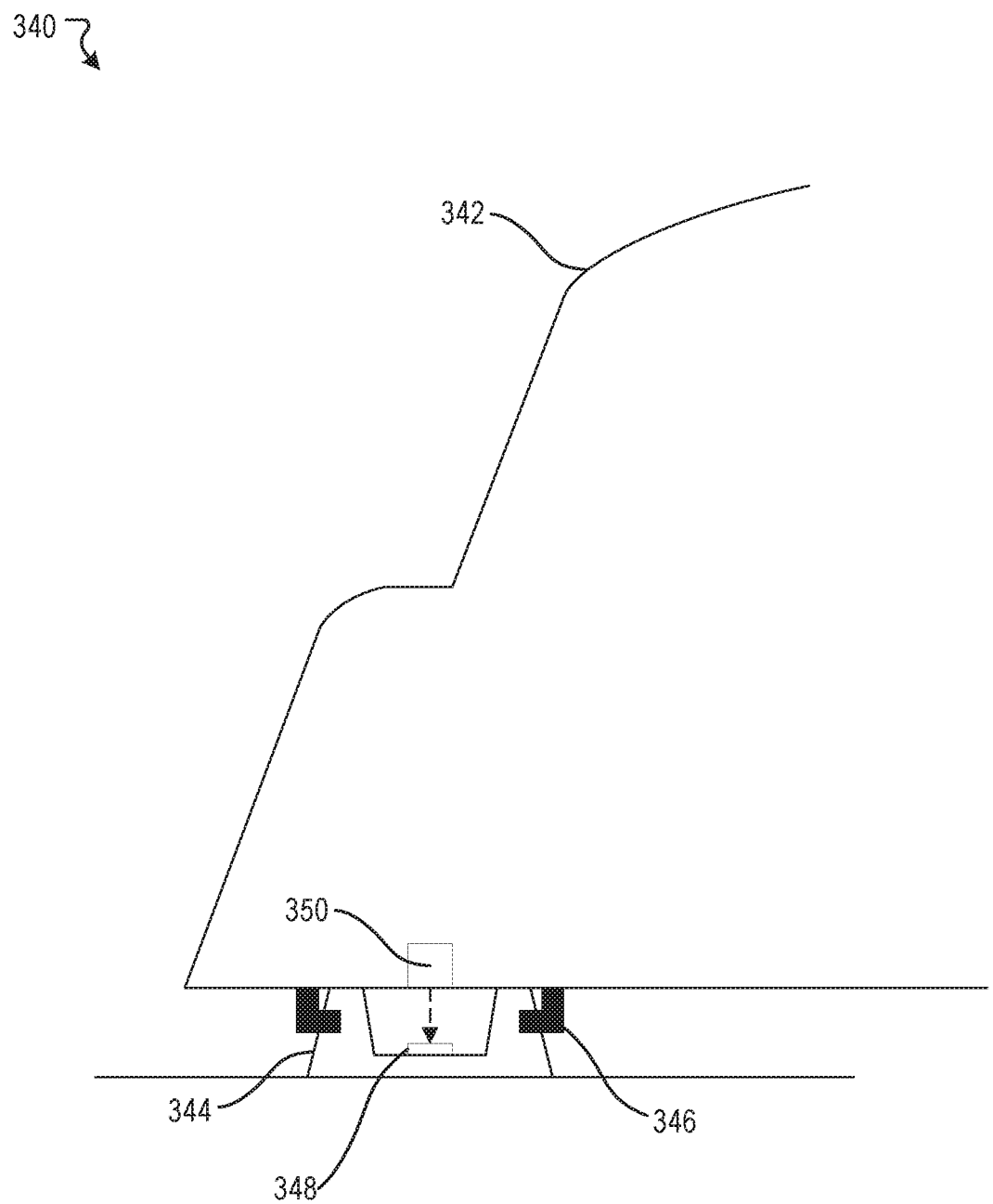
FIG. 3B illustrates a cross-sectional view of an example enclosure alignment system, according to an embodiment of the present disclosure.

FIG. 3B illustrates a cross-sectional view of an example enclosure alignment system 340, according to an embodiment of the present disclosure. In this example, the enclosure alignment system 340 includes an enclosure 342 mounted onto a fixture 344 secured by one or more securing clamps 346. The one or more securing clamps 346 hold the enclosure 342 securely onto the fixture 344. In some embodiments, the enclosure 342 can include a plurality of sensors (e.g., a LiDAR and a plurality of cameras) that are associated with an autonomous vehicle. In some embodiments, the enclosure 342 can be made from materials that are transparent to lights receptive to the plurality of sensors. Once mounted, the enclosure 342 can translate along rails of the fixture 344. In some embodiments, the enclosure alignment system 340 can further include a light detector 348 at a particular location within the rails of the fixture 344. This particular location indicates a final alignment location to which the enclosure 342 is positioned with respect to the fixture 344. This alignment position ensures that calibration associated with the plurality of sensors encased by the enclosure 342 remains intact and thus, data collected by the plurality of sensors can be subsequently processed and analyzed without further calibration. In this example, the enclosure 342 can further include a light source 350. The light source 350 can emit a light that can be received directly by the light detector 348. As the enclosure 342 is translated along the fixture 344, at some point, the light emitted by the light source 350 will be received directly by the light detector 348. When this occurs, it is an indication that the enclosure 342 is positioned correctly on the fixture 344, therefore the enclosure 342 is aligned. For example, the light detector 348 may determine whether a luminance of the light emitted by the light source 350 is equal to a known luminance of the light source. The light detector 404 may also determine a rate of change (e.g., derivative) of the luminance of the detected light 402 from the light source over time to determine the maximum luminance. In another example, the light detector 404 may also determine a rate of change (e.g., derivative) of the luminance of the detected light 402 from the light source over time to determine when the enclosure 342 is perfectly aligned with respect to the fixture. For example, the light detector 404 may determine that the enclosure 342 is perfectly aligned with respect to the fixture when the rate of change (e.g. derivative) of the luminance of the detected light 402 with respect to time, is zero. As another example, the light detector 404 may determine that the enclosure 342 is moving away from a fully aligned position with respect to the fixture if the determined rate of change of the luminance of the detected light 402 with respect to time, is negative. In such case, the enclosure 342 may be translated in an opposite direction to move toward the fully aligned position. As another example, the light detector may determine that the enclosure 342 is moving toward the fully aligned position with respect to the fixture if the determined rate of change of the luminance of the detected light 402 with respect to time, is positive.

Figure 4A:
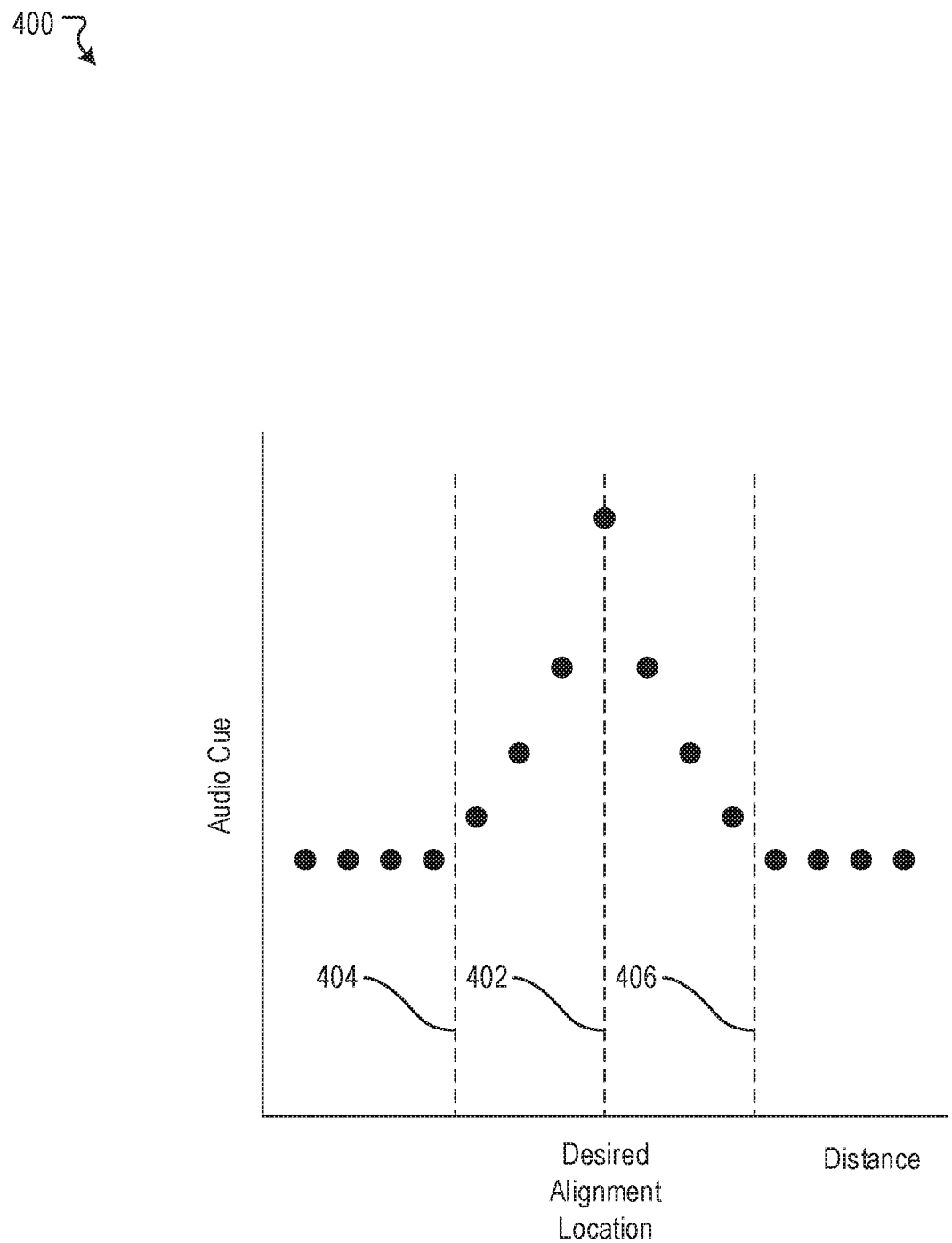
FIG. 4A illustrates an audio cue scenario, according to an embodiment of the present disclosure.

FIG. 4A illustrates an example audio cue scenario 400, according to an embodiment of the present disclosure. A x-y plot is presented in this example scenario 400, wherein an x-axis of the x-y plot represents a range of linear distance through which an enclosure (e.g., the enclosure 142 of FIG. 1B) can be translated along a fixture (e.g., the fixture 146 of FIG. 1B) and a y-axis of the x-y plot represents an audio cue. The audio cue can be a series of discrete audio (e.g., a "beep" sound) that varies in frequency, a continuous audio that varies in pitch, or a continuous audio that varies in amplitude (e.g., "loudness"). In this example, the series of discrete audio is depicted in the x-y plot. The example scenario 400 further depicts lines 402, 404, and 406 on the x-y plot. The line 402 indicates a final alignment location for the enclosure along the linear distance of the fixture. The line 402 also indicates a location that corresponds to a maximum intensity of a signal measured or seen by a signal receiver (e.g., the signal receiving engine 206 of FIG. 2). The lines 404 and 406 indicate locations in which the signal receiver detects, receives, or sees the signal. As the enclosure translates or moves along the fixture, as some point after the enclosure crosses the location indicated by the line 404 (or the line 406), the signal receiver starts to detect, receive, or see the signal. Correspondingly, the frequency of the series of discrete audio will increase (e.g., the "beep" sound becomes faster). Eventually, when the enclosure reaches the final alignment location, the intensity of the signal will be at its maximum and, correspondingly, the frequency of the discrete audio will be at its maximum.

Figure 4B:
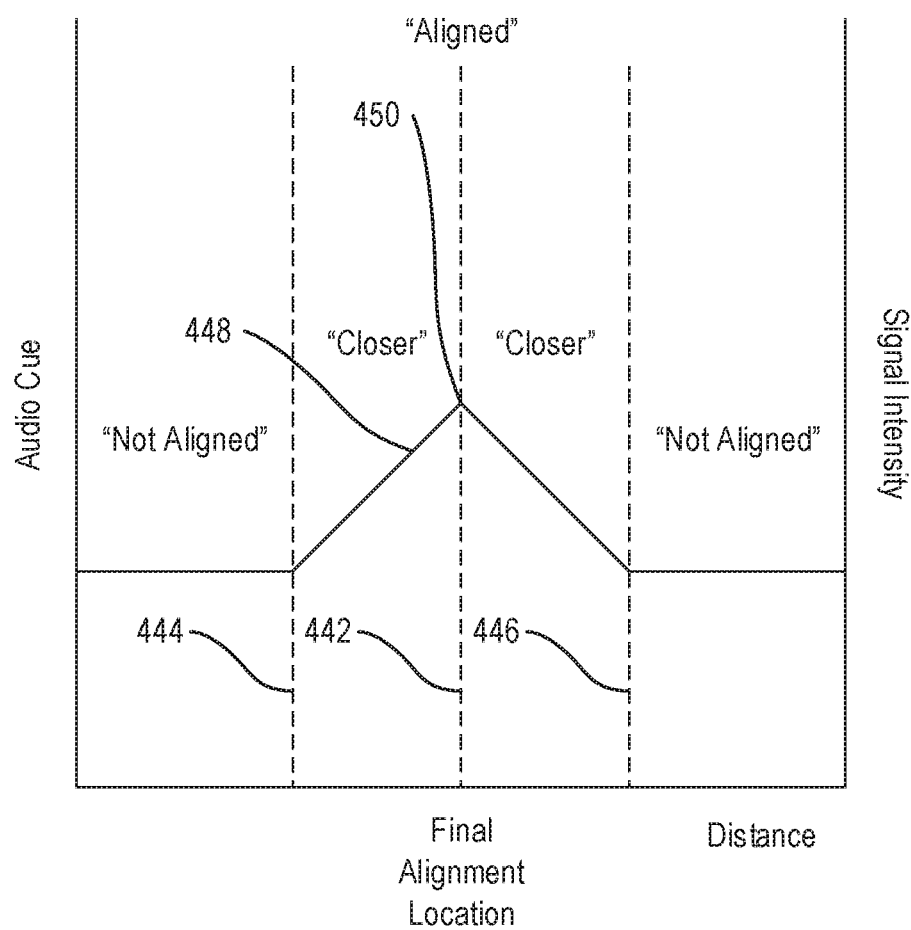
FIG. 4B illustrates an audio cue scenario, according to an embodiment of the present disclosure.

FIG. 4B illustrates an example audio cue scenario 440, according to an embodiment of the present disclosure. A x-y plot is presented in this example scenario 440, wherein a x-axis of the x-y plot represents a range of linear distance through which an enclosure (e.g., the enclosure 142 of FIG. 1B) can be translated along a fixture (e.g., the fixture 146 of FIG. 1B), a first y-axis of the x-y plot represents an audio cue, and a second y-axis of the x-y plot represents a signal intensity. In this example, the audio cue is depicted as sound profiles of "Not Aligned," "Closer," and "Aligned," in the x-y plot, and the signal intensity depicted as a plot 448 of intensity values that correspond to intensities measured or seen by a signal receiver (e.g., the signal receiving engine 206 of FIG. 2) along the range of linear distance. The example scenario 440 further depicts lines 442, 444, and 446 on the x-y plot. The line 442 indicates a final alignment location for the enclosure along the linear distance of the fixture. The line 442 also indicates a location that corresponds to a maximum intensity of a signal measured or seen by the signal receiver. The lines 444 and 446 indicate locations in which the signal receiver detects, receives, or sees the signal. As the enclosure translates or moves along the fixture, as some point after the enclosure crosses the location indicated by the line 444 (or the line 446), the signal receiver starts to detect, receive, or see the signal. Correspondingly, the intensity of the signal increases. Eventually, when the enclosure reaches the final alignment location, the intensity of the signal will be at its maximum, as indicated by an apex point 450 on the plot 448. In this example, in regions where the intensity is zero, the audio cue of "Not Aligned" is emitted periodically (e.g., once or twice per second). As soon as some intensity is measured or seen by the signal receiver, the audio cue changes from "Not Aligned" to "Closer." Eventually, when the intensity is at the maximum, the audio cue changes from "Closer" to "Aligned." Many variations are possible. For example, sound profiles of "Not Close," "Closer," and "Final Alignment" can be used in lieu of "Not Aligned," "Closer," and "Aligned." In some cases, the audio cue can include a direction of a translation. For example, sound profiles of "Move Forward," "Move Backward" and "Stop" can be used to indicate a direction to which the enclosure needs to be translated or moved in addition to the final alignment location. A relationship between the linear distance (e.g. from the signal to the final alignment location) and the audio cue may be linear or non-linear, such as a bell curve. A relationship between the linear distance (e.g. from the signal to the final alignment location) and the signal intensity may be linear or non-linear, such as a bell curve.

Figure 5:
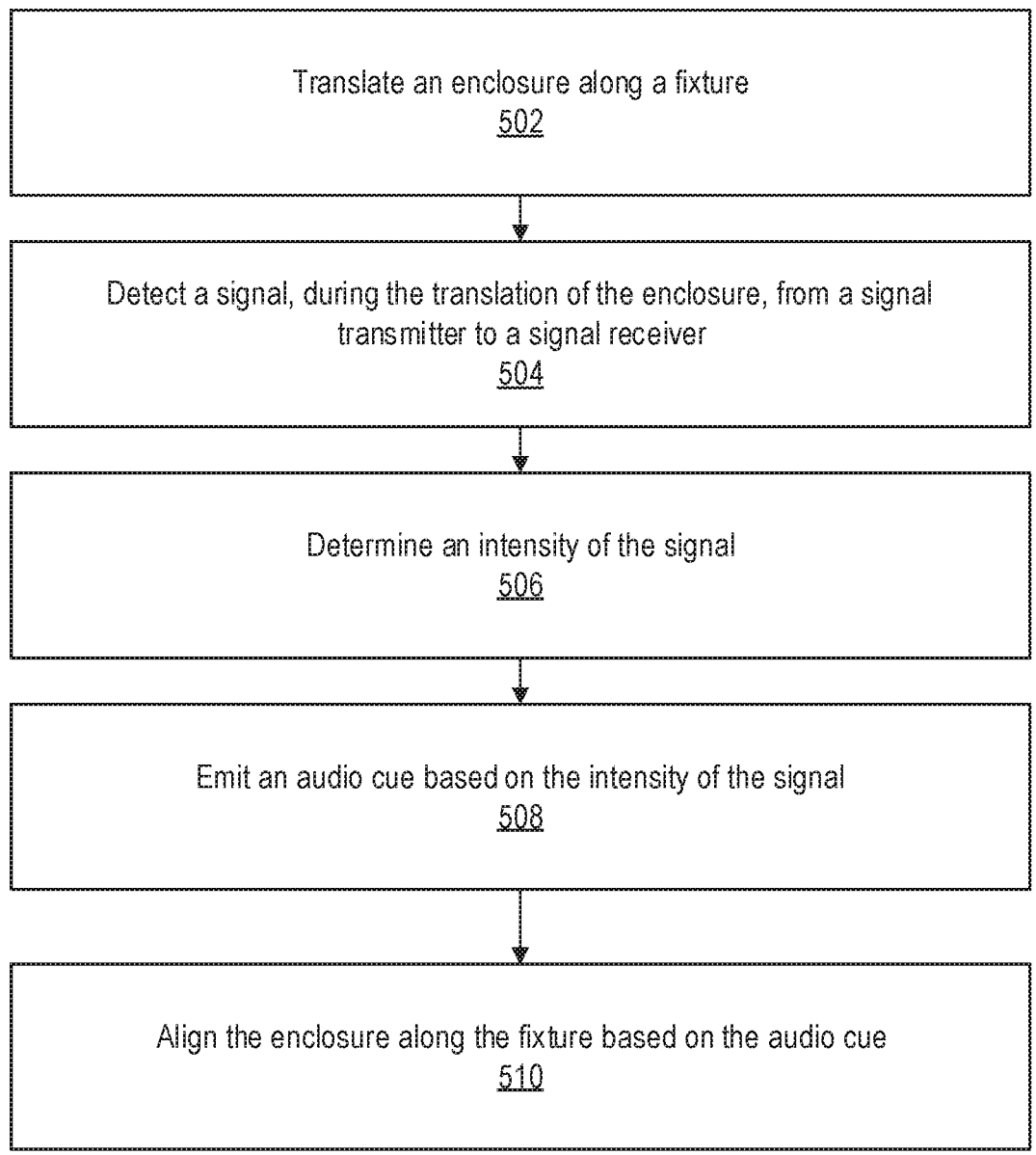
FIG. 5 illustrates an example method, according to an embodiment of the present disclosure.

FIG. 5 illustrates an example method 500, according to an embodiment of the present disclosure. The operations of method 500 presented below are intended to be illustrative. Depending on the implementation, the example method 500 may include additional, fewer, or alternative steps performed in various orders or in parallel. The example method 500 may be implemented in various computing systems or devices including one or more processors.

At block 502, an enclosure can be translated along a fixture. At block 504, a signal can be detected, during the translation of the enclosure, from a signal transmitter to a signal receiver. At block 506, an intensity of the signal can be determined. At block 508, an audio cue can be emitted based on the intensity of the signal. At block 510, the enclosure may be aligned (e.g., translated) along the fixture based on the audio cue. For example, if the audio cue indicates that the enclosure is not fully aligned with respect to the fixture, the enclosure may be further translated along the fixture until it is fully aligned with respect to the fixture. As another example, if the audio cue is decreasing in frequency or intensity, that may indicate the enclosure is moving away from the fully aligned position, and the enclosure may translate in an opposite direction to move toward the fully aligned position. As another example, if the audio cue indicates that the enclosure is fully aligned with respect to the fixture, the enclosure may be stopped at that position.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
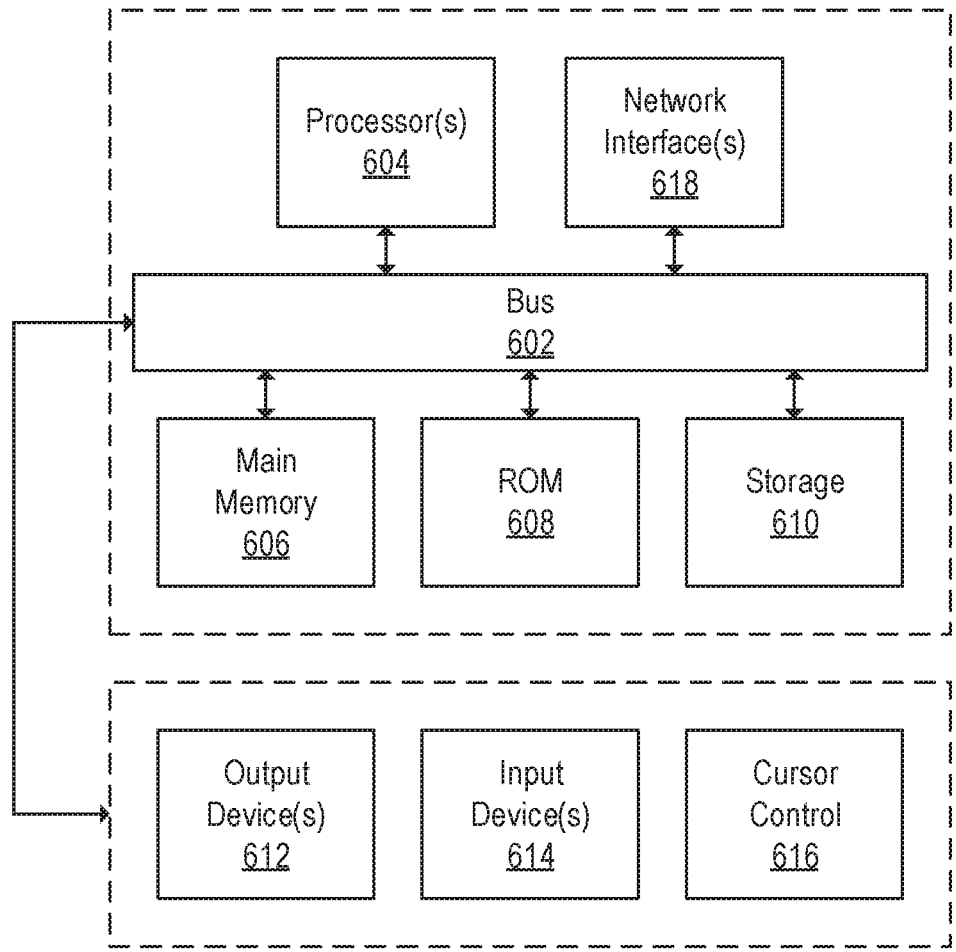
FIG. 6 illustrates a block diagram of a computer system.

FIG. 6 is a block diagram that illustrates a computer system 600 upon which any of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may retrieves and executes the instructions. The instructions received by main memory 606 may optionally be stored on storage device 610 either before or after execution by processor 604.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms.

Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A sensor enclosure alignment method comprising:
    translating a sensor enclosure along a fixture of a vehicle, wherein the sensor enclosure comprises a light detection and ranging sensor;
    detecting, by a signal receiver, during translation of the sensor enclosure, a signal transmitted from a signal transmitter associated with the sensor enclosure;
    determining an intensity of the signal based on the signal detected by the signal receiver;
    emitting an audio cue based on the intensity of the signal; and
    aligning the sensor enclosure along the fixture of the vehicle based on the emitted audio cue.

2. The method of claim 1, wherein the signal transmitter and the signal receiver are integrated into the sensor enclosure and a reflective surface is integrated into the fixture, and wherein the reflective surface reflects the signal transmitted by the signal transmitter prior to being detected by the signal receiver.

3. The method of claim 1, wherein the signal transmitter is integrated into the sensor enclosure and the signal receiver is integrated into the fixture, wherein the signal transmitted by the signal transmitter is directly detected by the signal receiver.

4. The method of claim 1, wherein determining the intensity of the signal comprises computing an intensity value corresponding to the signal detected by the signal receiver.

5. The method of claim 1, further comprising:
    determining a final alignment location for the sensor enclosure based on a location along the fixture that corresponds to a maximum intensity of the signal.

6. The method of claim 1, wherein the audio cue comprises a series of discrete audio, and wherein emitting the audio cue based on the intensity of the signal comprises:
    increasing a frequency of the series of discrete audio as the intensity of the signal increases.

7. The method of claim 1, wherein the audio cue comprises continuous audio, and wherein emitting the audio cue based on the intensity of the signal comprises:
    increasing a pitch of the continuous audio as the intensity of the signal increases.

8. The method of claim 7, wherein emitting the audio cue based on the intensity of the signal comprises:
    increasing an amplitude of the continuous audio as the intensity of the signal increases.

9. The method of claim 1, wherein the signal transmitter comprises a light source and the signal receiver comprises a light detector.

10. A sensor enclosure alignment system comprising:
    a sensor enclosure to be aligned onto a fixture of a vehicle, wherein the sensor enclosure comprises a light detection and ranging sensor;

a signal receiver to detect a signal transmitted from a signal transmitter associated with the sensor enclosure while the sensor enclosure translates along the fixture, and the signal receiver to determine an intensity of the signal;

an audio device to emit an audio cue based on the intensity of the signal; and a translation engine configured to align the sensor enclosure along the fixture of the vehicle based on the emitted audio cue.

11. The system of claim 10, wherein the signal transmitter and the signal receiver are integrated into the sensor enclosure and a reflective surface is integrated into the fixture, and wherein the reflective surface reflects the signal transmitted by the signal transmitter prior to being detected by the signal receiver.

12. The system of claim 10, wherein the signal transmitter is integrated into the sensor enclosure and the signal receiver is integrated into the fixture, wherein the signal transmitted by the signal transmitter is directly detected by the signal receiver.

13. The system of claim 10, wherein the signal receiver determines the intensity of the signal based on an intensity value corresponding to the signal detected by the signal receiver.

14. The system of claim 10, wherein the signal receiver determines a final alignment location for the sensor enclosure based on a location along the fixture that corresponds to a maximum intensity of the signal.

15. The system of claim 10, wherein the audio cue comprises a series of discrete audio, and wherein the audio device is configured to emit the audio cue by:

increasing a frequency of the series of discrete audio as the intensity of the signal increases.

16. The system of claim 10, wherein the audio cue comprises continuous audio, and wherein the audio device is configured to emit the audio cue by:

increasing a pitch of the continuous audio as the intensity of the signal increases.

17. The system of claim 16, wherein the audio device is configured to emit the audio cue by:

increasing an amplitude of the continuous audio as the intensity of the signal increases.

18. The system of claim 10, wherein the signal transmitter comprises a light source and the signal receiver comprises a light detector.

19. The system of claim 10, wherein the fixture is non-linear.

20. The system of claim 10, wherein the translation engine is configured to align the sensor enclosure based on a rate of change of an intensity of the audio cue over a time period.

* * * * *